United States Patent
Zhu

(10) Patent No.: US 8,786,710 B2
(45) Date of Patent: Jul. 22, 2014

(54) TEST SYSTEM AND METHOD FOR TESTING MOTHERBOARD OF CAMERA

(71) Applicants: Hong Fu Jin Precision Industry (ShenZhen) Co., LTD., Shenzhen (CN); Hon Hai Precision Industry Co., LTD., New Taipei (TW)

(72) Inventor: Hong-Ru Zhu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/858,098

(22) Filed: Apr. 8, 2013

(65) Prior Publication Data

US 2013/0286220 A1 Oct. 31, 2013

(30) Foreign Application Priority Data

Apr. 28, 2012 (CN) .......................... 2012 1 0128658

(51) Int. Cl.
*H04N 17/02* (2006.01)

(52) U.S. Cl.
USPC .......................................................... 348/187

(58) Field of Classification Search
USPC ................. 348/187, 188, 180–181, 175, 176; 714/28, 30–31, 36
See application file for complete search history.

(56) References Cited

U.S. PATENT DOCUMENTS

| 6,842,865 | B2 * | 1/2005 | Nee et al. ......................... 714/28 |
| 2002/0011856 | A1 * | 1/2002 | Huang et al. ................... 324/754 |
| 2002/0062461 | A1 * | 5/2002 | Nee et al. ......................... 714/28 |
| 2005/0159050 | A1 * | 7/2005 | Hama et al. .................... 439/651 |
| 2006/0046562 | A1 * | 3/2006 | Ou Yang et al. ............ 439/541.5 |
| 2006/0273818 | A1 * | 12/2006 | Takemoto ...................... 324/765 |

* cited by examiner

*Primary Examiner* — Paulos M Natnael
(74) *Attorney, Agent, or Firm* — Novak Druce Connolly Bove + Quigg LLP

(57) ABSTRACT

A test system for a motherboard of a camera includes a storage device, a processor, and a terminal device. The storage device pre-stores image signals. The processor is electronically connected between the storage device and the motherboard, and the terminal device is electronically connected to the motherboard. The terminal device pre-stores a plurality of pictures corresponding to the image signals in the storage device. The processor converts the image signals into test signals. The motherboard restores the test signals into images and transmits the images to the terminal device. The terminal device compares the plurality of pictures with the images, and determines a performance of the motherboard according to the comparison.

6 Claims, 2 Drawing Sheets

TEST SYSTEM AND METHOD FOR TESTING MOTHERBOARD OF CAMERA

BACKGROUND

1. Technical Field

The disclosure generally relates to test systems, and particularly to a test system and a test method for a motherboard of a camera.

2. Description of the Related Art

To test a motherboard of a camera, an optical camera and a charge coupled device (CCD) are electronically connected to the motherboard. Then, image signals captured by the optical camera and the CCD are transmitted to the motherboard of the camera, and are processed by an embedded image processor of the motherboard. Thus, a performance of the embedded image processor can be tested according to image qualities. However, all the hardware may require extra costs, and test accuracy may be influenced by brightness, focal length, and other factors.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments.

DETAILED DESCRIPTION

Figure 1:
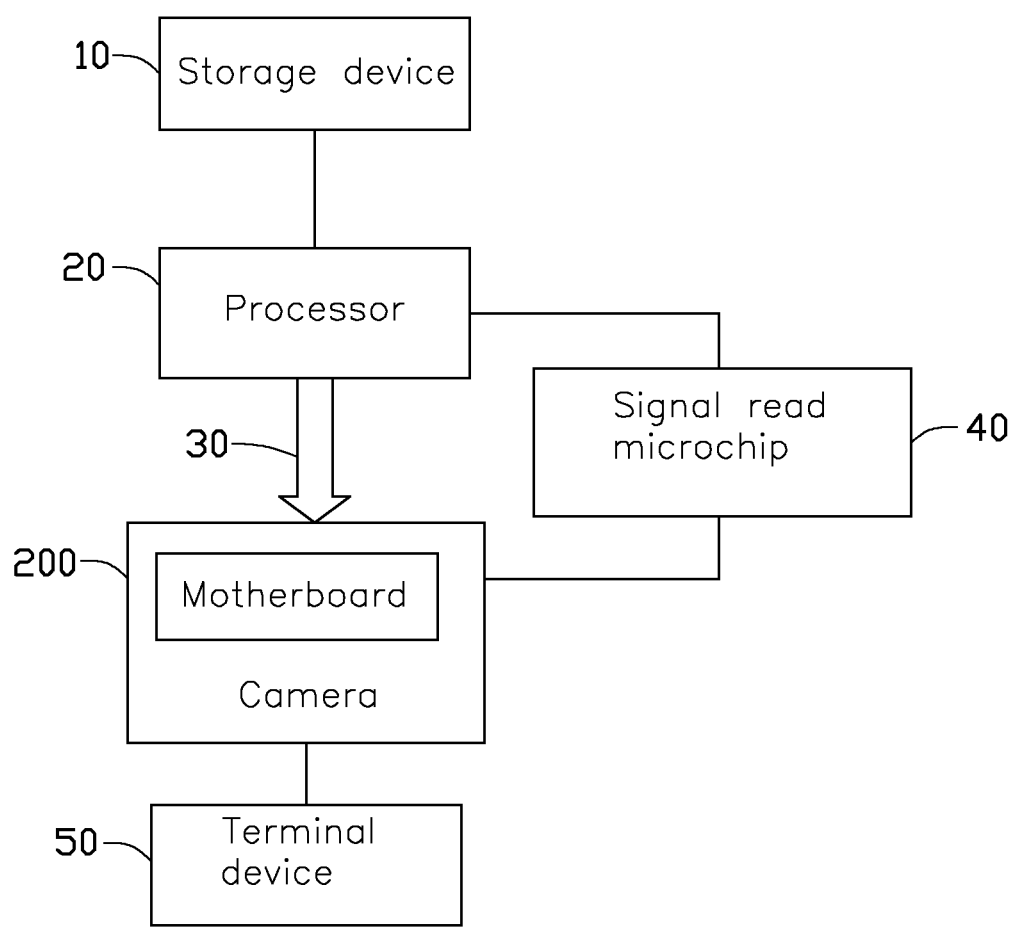
FIG. 1 is a block diagram of a test system for a motherboard of a camera, according to an exemplary embodiment.

FIG. 1 is a block diagram of a test system 100, according to an exemplary embodiment. The test system 100 is configured to test a motherboard 200 of a camera. The test system 100 includes a storage device 10, a processor 20, a signal read microchip 40, and a terminal device 50.

In one embodiment, the storage device 10 may be an internal storage device, such as a random access memory (RAM) for temporary storage of information, and/or a read only memory (ROM) for permanent storage of information. In some embodiments, the storage device 10 may also be an external storage device, such as an external hard disk, a storage card, or a data storage medium. The storage device 10 is a non-transitory storage medium.

The storage device 10 pre-stores image signals having different focal length and apertures. Generally, the longer the focal length, the smaller the depth of field of an image; the shorter the focal length, the greater the depth of field of the image; the larger the aperture, the smaller the depth of field of an image; the smaller the aperture, the greater the depth of field of the image. In one embodiment, the image signals are digital signals produced from coding the images.

In one embodiment, the processor 20 is a complex programmable logic device (CPLD). The processor 20 is electronically connected to the storage device 10 to process the image signals pre-stored in the storage device 10. For example, the processor 20 converts the image signals into test signals, which can be identified by the motherboard 200 of the camera. In one embodiment, the test signals include horizontal synchronizing signals, vertical synchronizing signals, serial data (SDA) signals, serial clock (SCL) signals, interrupt signals, and reset signals. In addition, the processor 20 is used to in response to a feedback of the motherboard 200, and continually reads the image signals pre-stored in the storage device 10.

The motherboard 200 is electronically connected to the processor 20 via a signal transmission bus 30. The motherboard 200 restores the test signals transmitted by the processor 20 into images. Additionally, the motherboard 200 outputs a control signal to request the processor 20 to continually read the image signals. For example, the motherboard 200 may request the processor 20 to read the image signals having a predetermined focal length and aperture, and the number of outputting the control signal via the motherboard 200 can be set in advance.

The signal read microchip 40 is electronically connected between the motherboard 200 and the processor 20. The signal read microchip 40 reads the control signal output from the motherboard 200, and transmits the control signal to the processor 20.

In one embodiment, the terminal device 50 is a personal computer (PC) that is electronically connected to the motherboard 200 of the camera, thus, images can be transmitted from the motherboard 200 to the terminal device 50. The terminal device 50 pre-stores a variety of pictures corresponding to the image signals pre-stored in the storage device 10. The terminal device 50 compares the pre-stored pictures with the images restored by the motherboard 200, and determines a performance of the motherboard 200 according to the comparison of the images restored by the motherboard 200 with the pre-stored pictures.

Figure 2:
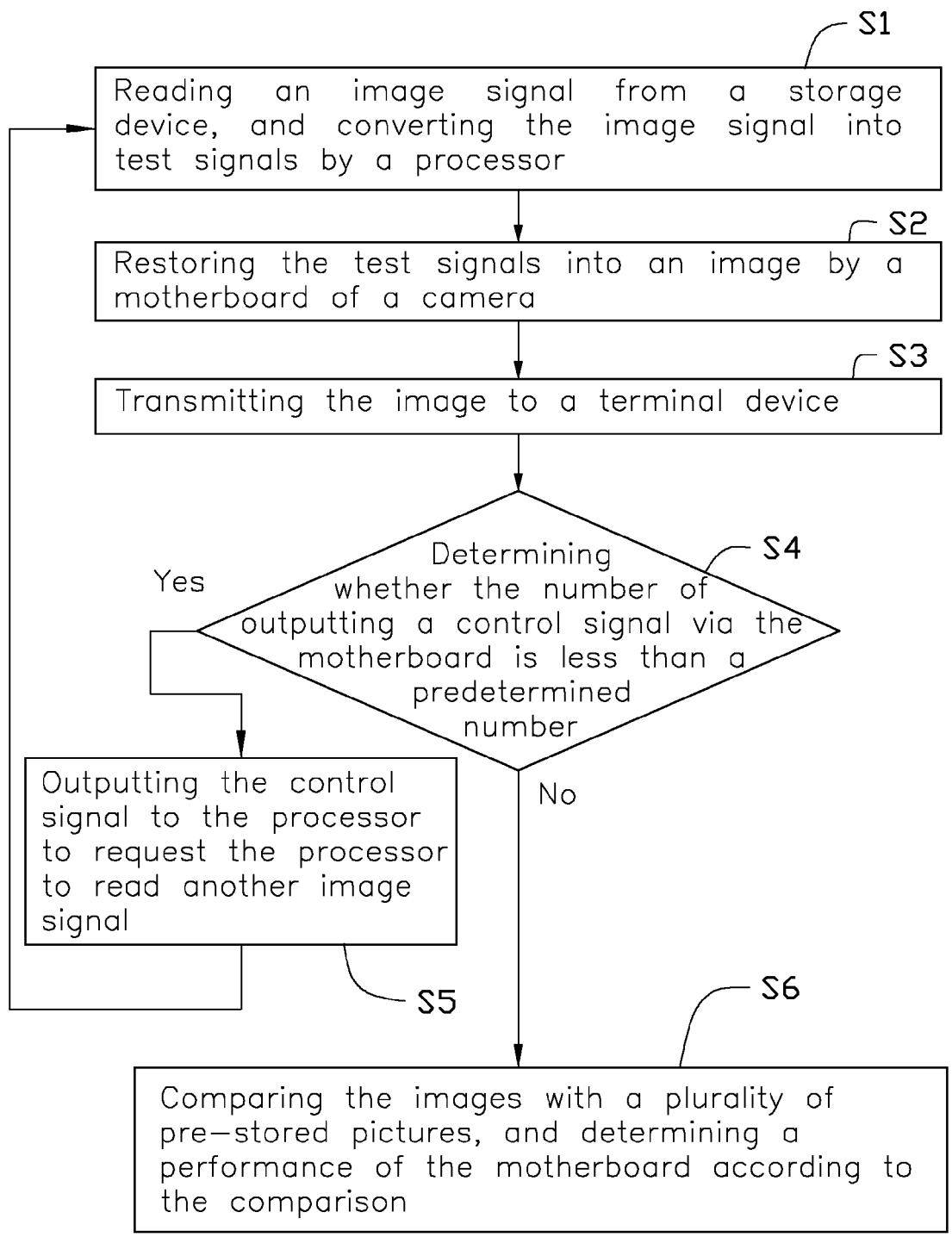
FIG. 2 is a flowchart illustrating a test method of the test system for the motherboard of the camera in FIG. 1, according to an exemplary embodiment.

FIG. 2 shows a test method for the motherboard 200 according to an exemplary embodiment. The test method includes at least following steps:

In step S1, the processor 20 reads an image signal from the storage device 10, and converts the image signal into the test signals.

In step S2, the processor 20 transmits the test signals to the motherboard 200, and the motherboard 200 restores the test signals into an image.

In step S3, the motherboard 200 transmits the image to the terminal device 50.

In step S4, the motherboard determines whether the number of outputting a control signal via the motherboard 200 is less than a predetermined number. If the number of outputting the control signal via the motherboard 200 is less than a predetermined number, step S5 is implemented. If the number of outputting the control signal via the motherboard 200 is equal to or greater than the predetermined number, step S6 is implemented.

In step S5, the motherboard 200 outputs the control signal to the processor 20 via the signal read microchip 40 to request the processor 20 to read another image signal having a different focal length and aperture, and then the step S1 is implemented.

In step S6, the terminal device 50 compares the images restored by the motherboard 200 with the pre-stored pictures, and determines the performance of the motherboard 200 according to the comparison. Thus, imaging uniformity, image noise, color rendition, resolution ratio, gray level, and other performances of the motherboard 200 can be tested.

In other embodiments, the processor 20 is electronically connected to a plurality of motherboards 200 via a plurality of signal transmission buses 30, and each motherboard 200 is electronically connected to the processor 20 via one signal read microchip 40.

In summary, the storage device 10 pre-stores image signals, the processor 20 convents the image signal into the test signals, and transmits to the motherboard 200. Thus, the motherboard 200 restores the test signals into images, and then the terminal device 50 determines the performance of the motherboard 200 accordingly. Therefore, the test system 100 costs less since an optical camera and a charge coupled device (CCD) are not used. Additionally, the test system 100 exhibits higher accuracy because the test is not as influenced by brightness, focal length, and other factors.

Although numerous characteristics and advantages of the exemplary embodiments have been set forth in the foregoing description, together with details of the structures and functions of the exemplary embodiments, the disclosure is illustrative only, and changes may be made in detail, especially in the matters of arrangement of parts within the principles of disclosure to the full extent indicated by the broad general meaning of the terms in which the appended claims are expressed.

What is claimed is:

1. A test system for a motherboard of a camera, the test system comprising:
    a storage device pre-storing image signals;
    a processor electronically connected between the storage device and the motherboard; and
    a terminal device electronically connected to the motherboard, the terminal device pre-storing a plurality of pictures corresponding to the image signals in the storage device;
    wherein the processor converts the image signals into test signals, the motherboard restores the test signals into images and transmits the images to the terminal device, the terminal device compares the plurality of pictures with the images, and determines a performance of the motherboard according to the comparison of the plurality of pictures with the images, the motherboard requests the processor to read the image signals from the storage using a control signal; and
    wherein the test system further comprises a signal read microchip electronically connected between the motherboard and the processor, the signal read microchip transmits the control signal from the motherboard to the processor.

2. The test system as claimed in claim 1, wherein the processor continually reads the image signals from the storage device in response to the control signal.

3. The test system as claimed in claim 1, wherein the test signals include horizontal synchronizing signals, vertical synchronizing signals, serial data (SDA) signals, serial clock (SCL) signals, interrupt signals, and reset signals.

4. The test system as claimed in claim 1, wherein the processor is a complex programmable logic device (CPLD).

5. The test system as claimed in claim 1, wherein the terminal device is a personal computer (PC).

6. A test method for a motherboard of a camera, the test method comprising:
    reading an image signal from a storage device, and converting the image signal into test signals by a processor;
    restoring the test signals into an image by the motherboard;
    transmitting the image to a terminal device;
    comparing the images with a plurality of pre-stored pictures, and determining a performance of the motherboard according to the comparison;
    determining whether the number of outputting a control signal via the motherboard is less than a predetermined number; and
    outputting the control signal to the processor to request the processor to read another image signal if the number of outputting the control signal via the motherboard is less than the predetermined number.

* * * * *